United States Patent [19]

Nakagawa

[11] 4,430,796
[45] Feb. 14, 1984

[54] METHOD AND APPARATUS FOR DETERMINING THE LOCATION OF POINTS ON A THREE DIMENSIONAL THING

[75] Inventor: Haruki Nakagawa, Saitama, Japan

[73] Assignee: Kosaka Laboratory Ltd., Tokyo, Japan

[21] Appl. No.: 345,806

[22] Filed: Feb. 3, 1982

[30] Foreign Application Priority Data

Feb. 9, 1981 [JP] Japan .................................. 56-16830

[51] Int. Cl.³ .............................................. G01B 7/28
[52] U.S. Cl. ...................................... 33/1 M; 33/121
[58] Field of Search ................. 33/1 M, 179.5 R, 121, 33/174 P

[56] References Cited

U.S. PATENT DOCUMENTS

| | | | |
|---|---|---|---|
| 3,924,450 | 12/1975 | Uchiyama et al. ................... | 33/1 M |
| 4,166,323 | 9/1979 | Maag ............................... | 33/179.5 R |
| 4,276,699 | 7/1981 | Sterkl et al. ..................... | 33/179.5 R |
| 4,276,700 | 7/1981 | Tanno et al. ...................... | 33/179.5 R |
| 4,300,390 | 11/1981 | Shimizu ............................ | 33/1 M |

*Primary Examiner*—Willis Little
*Attorney, Agent, or Firm*—Cushman, Darby & Cushman

[57] ABSTRACT

This invention discloses a method and an apparatus in which coordinates of points on a plurality of sections of a three dimensional thing are measured based on a plurality of different coordinate systems and then transformed into those in a single reference coordinate system. The coordinates of the section adjacent to the reference section are transformed into coordinates in the reference coordinate system which is used to measure the coordinates of the points on the reference section through the following processes: measuring the coordinates of at least three reference points on the overlapped portion between the reference section and the adjacent section based on the reference coordinate system and the second coordinate system which is used to measure the coordinates of the points on the adjacent section; determining the positional relation between the two systems above using the measured coordinates of the reference points; and then, transforming the coordinates of the points on the adjacent section defined by the second coordinate system into those in the reference section using the above positional relation. The coordinates of points in the other sections are subjected to similar processes to express them in the reference system.

6 Claims, 4 Drawing Figures

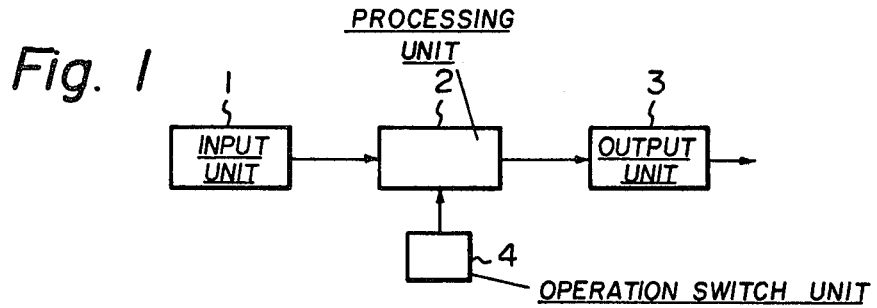
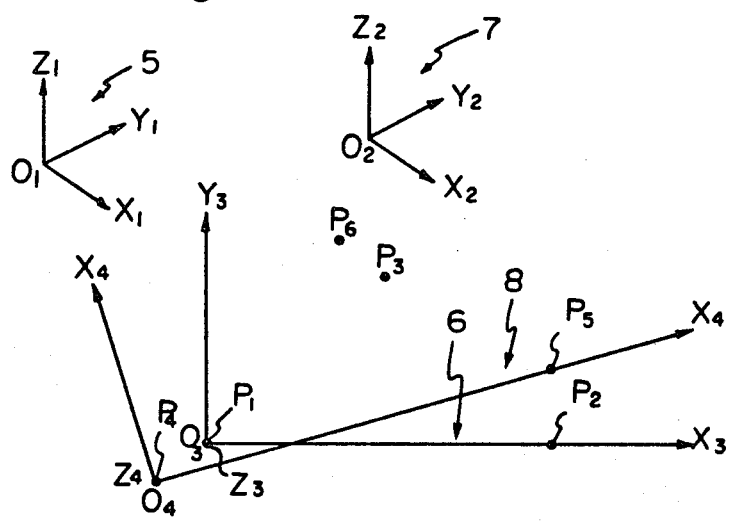
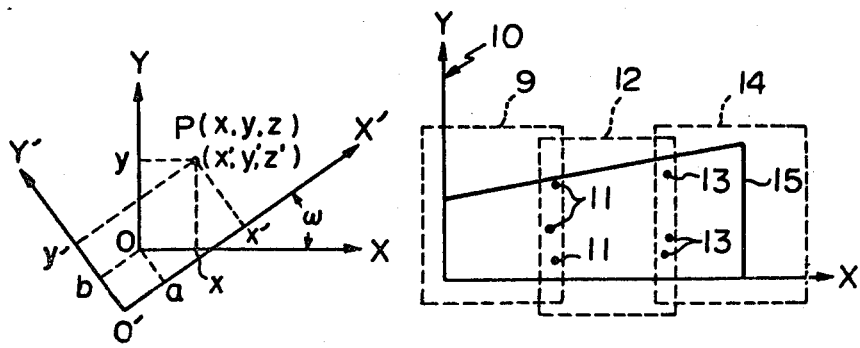

METHOD AND APPARATUS FOR DETERMINING THE LOCATION OF POINTS ON A THREE DIMENSIONAL THING

BACKGROUND OF THE INVENTION

This invention relates to a method and an apparatus for determining the location of points on a three dimensional thing, contour, size or the like of the same by measuring coordinates of points on the thing.

Various types of three dimensional coordinate measuring apparatuses have been used to measure the coordinates of points on a three dimensional thing to determine the contour, size or the like. Such apparatus naturally have limits in space on the measurement which the apparatuses can achieve with the apparatus fixed at one position. Accordingly, when a three dimensional thing is large so that the area of the thing to be measured exceeds the limits of measurement as stated above, it is required to divide the area into a plurality of sections and to measure the respective sections by changing the position of the thing relative to the apparatus. Thus, in such measurement, the coordinates of the points on the respective sections are not defined by a single reference coordinate system which is determined with respect to the thing and, thus, it is impossible to determine the contour, size or the like of the entire thing directly from such measured coordinates.

Accordingly, in the past, in order to make it easy to transform such measured coordinates into coordinates in a reference coordinate system on the thing, an operator usually took the following operation: a coordinate axis or axes of the coordinate measuring apparatus was made to be aligned with or parallel to the coordinate axes which are predetermined with respect to the thing by adjusting the relative position between the apparatus and the thing or by using a conventional coordinate transformation apparatus and, when the thing is moved to effect measurements of respective sections on the thing, the thing is moved keeping a predetermined portion of the thing parallel to or parpendicular to the reference coordinate axis or the reference coordinate surface of the coordinate measuring apparatus. However, keeping such relation between the thing and the apparatus is difficult and, thus, it is difficult to effect accurate measurement. Further, if the thing has no straight line or a flat plane thereon, such operation per se is impossible.

SUMMARY OF THE INVENTION

Accordingly, this invention aims to provide a method and an apparatus which can determine coordinates of points on an entire thing in a single reference coordinate system from coordinates measured with respect to points on sections of the thing without effecting such operation as stated above in connection with the prior art.

Briefly, the method of this invention comprises the following steps:

dividing an area of a three dimensional thing to be measured into a plurality of sections in such manner that the adjacent sections partially overlap each other; determining at least three points on the respective overlapped portions between the adjacent sections; measuring coordinates of the reference points on the overlapped portion between the first reference section and the second section adjacent to the first reference section based on a first coordinate system; measuring coordinates of the same reference points based on a second coordinate system; further, if there are more than two sections to be measured, measuring coordinates of at least three reference points on the other respective overlapped portions between successive adjacent sections based on two coordinate systems by which the coordinates of points on the adjacent sections are defined; processing the coordinates of said reference points so as to determine the positional relation between the first reference coordinate system and the second and other coordinate systems; transforming coordinates of points on the thing defined by the second and other coordinate systems into coordinates in the first reference coordinate system based on said positional relations; whereby, the location of points on the three dimensional thing, contour, size or the like of the same can be determined based on the first reference coordinate system.

An apparatus in accordance with this invention used in the above method basically includes an input means for receiving coordinates of points on a first section of a three dimensional thing defined based on a first coordinate system and coordinates of points on a second section of the thing defined based on a second coordinate system; and, a processing means adapted to determine the positional relation between the first and second coordinate systems by processing the coordinates of at least three points which are determined on the overlapped portion between the first and second sections and defined based on the first and second coordinate systems and to transform the coordinates of the points on the second section defined based on the second coordinate system into those in the first coordinate system using the above positional relation between the first and second coordinate systems.

Other objects and advantages of this invention will become more apparent to those skilled in the art in view of the following description and the accompanying drawings.

BRIEF DESCRIPTION OF THE DRAWINGS

FIG. 1 is a block diagram of a coordinate transformation apparatus in accordance with this invention.

FIG. 2 is a view for explaining a general coordinate transformation.

FIG. 3 is a view for explaining a coordinate transformation effected in the method of this invention.

FIG. 4 is a view for explaining the operation of this invention.

DETAILED DESCRIPTION OF THE INVENTION

With reference to FIG. 1, there is shown a block diagram of a coordinate transformation apparatus used in a method in accordance with this invention. The apparatus has an input unit 1 for receiving coordinates of points on sections of a thing measured by a coordinate measuring apparatus (not shown) which is positioned at different positions relative to the thing to measure the sections above (thus, the coordinate of the points on respective sections being defined by a plurality of coordinate systems in a reference coordinate system defined on the thing), a processing unit 2 for processing the above coordinates to express them in the reference coordinate system, an operation switch unit 4 for operating the processing unit 2 and an output unit 3 for receiving the coordinates processed by the processing unit 2 and supplying necessary outputs in desired forms such as directly readable or visual information, electric signals or the like.

The coordinate transformation principle used in this invention will be briefly explained with reference to FIG. 2 hereinbelow. In FIG. 2, there are two (2) three dimensional orthogonal coordinate systems: the first having coordinate axes X, Y and Z and origin O and the second having coordinate axes X', Y' and Z' and origin O'. The coordinate axes Z and Z' are perpendicular to the sheet of this figure. The origin O' of the second system has the coordinates $(-a, -b, O)$ with respect to the origin O of the first system and the axes X' and Y' make an angle $\omega$ with respect to the axes X and Y, respectively. In such coordinate systems, when coordinates (x, y, z) of an arbitrary point p defined in the system X, Y, Z are transformed into coordinates (x', y', z') in the system X', Y', Z', such transformation is effected using the following equations.

$$x' = a + x \cos \omega + y \sin \omega$$

$$y' = b + y \cos \omega + x \sin \omega$$

$$z' = z$$

Such equations are well known, thus, the detailed explanation is omitted herein.

Next, the processing principle of the processing unit 2 will be explained hereinbelow with reference to FIG. 3.

It is assumed that three points on a three dimensional thing (not shown) are measured by a coordinate measuring apparatus (not shown) to determine the coordinates thereof and the same three points are measured by the coordinate measuring apparatus, the position relative to the thing of which differs from that of the apparatus which effects the first measurement just mentioned above, so that coordinates $p_1$, $p_2$, $p_3$ of these three points measured in the first measurement (each of which includes x, y, z coordinates of the corresponding point on the thing) are defined in a first coordinate system 5 having coordinate axes $X_1$, $Y_1$, $Z_1$ and coordinates $p_4$, $p_5$, $p_6$ of the same points (each of which includes x, y, z coordinates of the corresponding point) are defined in a second coordinate system 6 having coordinate axes $X_2$, $Y_2$, $Z_2$ which is different from the first coordinate system.

Then, the first coordinate system 5 is shifted so that three points $p_1$, $p_2$, $p_3$ are laid on a coordinate plane $X_3$-$Y_3$ of the shifted coordinate system 6. This operation is hereinbelow called "transformation (A)".

Next, the second coordinate system 7 is shifted so that three points $p_4$, $p_5$, $p_6$ are laid on a coordinate surface $X_4$-$Y_4$ of the shifted system 8 and the positional relation between the shifted coordinate axes $X_4$, $Y_4$, $Z_4$ and the points $p_4$, $p_5$, $p_6$ becomes the same as that between the shifted coordinate axes $X_3$, $Y_3$, $Z_3$ and the points $p_1$, $p_2$, $p_3$. This operation is hereinbelow called "transformation (B)".

The above stated transformations (A) and (B) are for example effected as follows:

(1) The origins of the first and second systems 5, 7 are shifted so that the origins thereof coincide with ones $P_1$ and $P_4$ of the above points both of which represent the same point on the thing; then, (2) The shifted coordinate systems are further moved so that the x coordinate axes thereof pass through the points $P_2$ and $P_5$, respectively; and, then, (3) The shifted coordinate system are further moved so that the points $P_3$ and $P_6$ are laid on the plane $X_3$-$Y_3$ and $X_4$-$Y_4$. (The coordinate system finally shifted from the first coordinate system 5 is hereinbelow called the third coordinate system 6 and the coordinate system shifted from the second coordinate system 7 is hereinbelow called the fourth coordinate system 8.)

Since the points $p_1$, $p_2$, $p_3$ and the points $p_4$, $p_5$, $p_6$ represent the same points on the thing, respectively, the positional relation of them with respect to the third and fourth coordinate systems must be the same; however, since there may be errors caused in detecting or measuring operation of the points on the thing and errors proper to the apparatus, the above mentioned relations may not exactly coincide with each other. However, they are usually close enough to each other to be recognized to be the same. In FIG. 3, such misalignment is exaggeratedly shown. In such a case that the points on the thing can not be determined with enough distances therebetween so that an unignorable misalignment between the above mentioned positional relations is caused, the fourth coordinate system 8 is further shifted as follows to minimize such misalignment. (This operation is hereinbelow called "transformation C"). That is, the fourth coordinate system 6 is superimposed on the third coordinate system 6 keeping the relation of points $P_1$, $P_2$, $P_3$ and $P_4$, $P_5$, $P_6$ with respect to the corresponding coordinate system 6 and 8 as they are so that the sum of the suqares of distances between the corresponding points $p_1$ and $p_4$, $p_2$ and $p_5$, $p_3$ and $p_6$ becomes minimum. Such operation is a statistical method of minimizing such errors as stated above. The coordinate system obtained through the transformation C is closer to the third coordinate system 6 than the fourth coordinate system 8.

As noted from the above, the transfer of the second coordinate system 7 to the first coordinate system 5 can be achieved by the following porcesses:

(1) The second coordinate system 7 is shifted to the position of the fourth coordinate system 8 through "transformation B"; then, (2) The shifted coordinate system is further shifted through "transformation C" through this second process is not necessary if the errors in measured coordinates $P_4$, $P_5$, $P_6$ as stated above are small; and, (3) The shifted coordinate system is further shifted to the position of the first coordinate system 5 through the process reverse to "transformation A".

Accordingly, the coordinates in the second coordinate system 7 can be transformed into the coordinates in the first coordinate system 5 by subjecting the former coordinates to the successive processes just stated above. Therefore, if the first coordinate system is beforehand made to coincide with a particular coordinate system determined with respect to the thing, the coordinate measured by the coordinate measuring apparatus can be transformed into those in the particular coordinate system of the thing through the above stated transformation processes.

Next, an example of measuring a large thing 15 in accordance with the present invention will be explained hereinbelow with reference to FIG. 4:

(a) First, a three dimensional thing 15 is positioned relative to a three dimensional coordinate measuring apparatus (not shown) so that a portion of the thing comes into the scope 9 in which the apparatus can measure.

(b) The coordinate transformation unit 2 is adjusted so that coordinates in the coordinate system proper to the three dimensional coordinate measuring apparatus (corresponding to the second coordinate system 7 stated above) are transformed into coordinates in the coordinate system 10 which is determined with respect to the thing (corresponding to the first coordinate system 5 stated above). Such coordinate transformation function is known in prior art and thus the details will not be explained herein.

(c) The coordinates of the points of the portion of the thing within the scope 9 are measured. The measured coordinates are defined by the coordinate system 10 of the thing by means of the above adjusted coordinate transformation unit.

(d) Three reference points 11 are determined on the portion of the thing within the scope 9 and the coordinates thereof are measured and temporarily stored.

(e) The relative position between the thing and the measuring apparatus is changed so that the apparatus can measure a second portion of the thing other than the first portion. The measuring scope 12 of the apparatus of the new position is made to cover the above stated reference points 11.

(f) The three reference points 11 are again measured by the newly positioned coordinate measuring apparatus to determine the coordinates thereof by the coordinate system of the apparatus and the processing unit 2 is adjusted using the previously and newly measured coordinates of the reference points to effect transformation processes such as (1), (2) and (3) stated on page 8 with respect to the coordinates measured by the newly positioned coordinate measuring apparatus and defined by its coordinate system.

(g) The points on the second portion of the thing within the scope 12 are measured to determine the coordinates thereof. The coordinates are transformed into those defined by the coordinate system 10 through the above adjusted coordinate transformation unit.

(h) When the thing is too large to measure through the above stated processes, other reference points 13 are determined on the second portion above and the relative position between the coordinate measuring apparatus and the thing is changed to newly define the measuring scope 14 of the coordinate measuring apparatus with respect to the thing, thereafter the processes similar to the processes (f)–(g) as stated above will be effected.

Though in the above operation the coordinates measured in the respective portions are sequentially transformed, it is possible to store those coordinates temporarily on magnetic tapes, paper tapes or the like and, after the measurement on all of the sections of the thing, to subject them to coordinate transformation processes (1)–(3) on page 8 to obtain the coordinates of the measured points based on the coordinate system of the thing. Further, though the above description has decribed only the measurement of a large thing, this invention can be utilized in such a case that a thing has a portion which the probe of the coordinate measuring apparatus can not approach, for example, the bottom surface thereof abutting against the surface of the thing supporting plate of the apparatus while the thing is small and can be positioned within the measuring scope of the apparatus. That is, in such case, the thing is overturned to expose the bottom surface of the same and subjected to the processes similar to those stated above in connection with the measurement of the larger thing to measure the coordinates of points on the bottom surface.

While this invention has been described in conjunction with the specific embodiment, it is to be understood that many alternatives, modifications, and variations will be apparent to those skilled in the art.

What is claimed is:

1. A method for determining the location of points on a three dimensional thing, contour, size or the like of the same by measuring coordinates of points on the thing, said method comprising the steps of:
   (a) dividing the area of said thing to be measured into a plurality of sections in such a manner that adjacent sections partially overlap each other;
   (b) determining at least three reference points on the respective overlapped portions of said adjacent sections;
   (c) measuring coordinates of said reference points on the overlapped portion between a first reference section and a second section adjacent to the first reference section based on a first coordinate system which is used to measure the coordinates of points on the first reference section;
   (d) measuring coordinates of the same reference section; based on a second coordinate system which is used to measure the coordinates of points on the second section;
   (e) further, if there are more than two sections to be measured, measuring coordinates of at least three reference points on the other respective overlapped portions between successive adjacent sections based on two coordinate systems which are used to measure the coordinates of points on the adjacent sections;
   (j) processing the coordinates of said reference points so as to determine the positional relation between said first reference coordinate system and said second and other coordinate systems;
   (g) transforming coordinates of points on said thing defined by said second and other coordinate systems into coordinates in said first reference coordinate system based on said positional relations; whereby, the location of points on the three dimensional thing, contour, size or the like of the same can be determined based on the first reference coordinate system.

2. A method in accordance with claim 1 in which said first reference coordinate system is made to coincide with a coordinate system which is predetermined on said thing.

3. A method in accordance with claim 1 in which three reference points are determined on the overlapped portion between said first reference section and the second section, the coordinates of points on the second section defined by said second coordinate system being transformed into coordinates in the first reference coordinate system by subjecting them to a transformation process (B) as defined below and a second transformation process which is reverse to the following process (A): the process (A) in which the first coordinate system is shifted so that the points on the coordinate system, the coordinates of which are defined by the first reference coordinate system by measuring said three reference points, are positioned in a coordinate plane including two coordinate axes of the shifted system, and, transformation process (B) in which the second coordinate system is shifted so that the points on the coordinate system, the coordinates of which are defined by the second coordinate system by detecting the same reference points, are positioned on a plane including corresponding two coordinate axes of the shifted system, and the positional relation between the shifted axes thereof and the points becomes the same as that of the shifted first coordinate axes and the corresponding points; and, if there are more than two sections, similar coordinate transformation processes are effected with respect to the coordinates of points on the other sections; whereby the coordinates of the points determined by the second and successive systems are transformed into those in the first reference coordinate system.

4. A method in accordance with claim 3 in which after the coordinates of points on the second section defined by said second coordinate system are subjected to said transformation process (B), they are subjected to the following transformation process (C) and thereafter to said process reverse to said transformation process (A): the transformation process (C) in which said shifted second coordinate system is further shifted so that said shifted second coordinate system is superimposed on said shifted first coordinate system and the sum of the squares of the distances between the points on the shifted first and second coordinate systems representing the first point of said three reference points, the points on the same systems representing the second reference point and the points on the same systems representing the third reference point.

5. A coordinate transformation apparatus including:
   an input means for receiving coordinates of points on a first section of a three dimensional thing defined based on a first coordinate system and coordinates of points on a second section of the thing defined based on a second coordinate system, said first and second sections having an overlapped portion; and,
   a processing means for (i) determining the positional relation between the first and second coordinate systems, (ii) processing the coordinates of at least three points which are determined on the overlapped portion between said first and second sections and defined based on said first and second coordinate systems; and (iii) transforming said coordinates of the points on the second section defined based on the second coordinate system into those in the first coordinate system using said positional relation between said first and second coordinate systems.

6. An apparatus in accordance with claim 5 in which said processing means includes means for shifting the first coordinate system to coincide said first coordinate system with a predetermined reference coordinate system on said thing.

* * * * *

UNITED STATES PATENT AND TRADEMARK OFFICE
CERTIFICATE OF CORRECTION

PATENT NO.   :   4,430,796
DATED        :   February 14, 1984
INVENTOR(S)  :   Haruki NAKAGAWA It is certified that error appears in the above-identified patent and that said Letters Patent is hereby corrected as shown below:

Claim 1, Column 6, lines 26 and 27, change "same reference section;"

to -- same reference points--.

Claim 1, Column 6, line 37, change "(j)" to --(f)--.

Signed and Sealed this

Tenth Day of September, 1996

Attest:

BRUCE LEHMAN

Attesting Officer      Commissioner of Patents and Trademarks